(12) United States Patent
Kikuchi

(10) Patent No.: US 6,924,905 B2
(45) Date of Patent: Aug. 2, 2005

(54) COMPOSITE SYSTEM CAPABLE OF SELECTIVELY REALIZING PRINT FUNCTION AND READ FUNCTION

(75) Inventor: Shoji Kikuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/139,709

(22) Filed: Aug. 26, 1998

(65) Prior Publication Data

US 2002/0085216 A1 Jul. 4, 2002

(30) Foreign Application Priority Data

Sep. 1, 1997 (JP) .............................................. 9-250124

(51) Int. Cl.[7] .............................................. G06F 15/00
(52) U.S. Cl. ........................ 358/1.6; 358/468; 358/474; 399/144; 399/148
(58) Field of Search ........................ 358/1.1, 1.6, 1.12, 358/1.13, 1.15, 400, 468, 474, 498, 1.14, 401, 442, 472, 494; 399/144, 148; 347/3, 19, 22, 49, 87; 400/61

(56) References Cited

U.S. PATENT DOCUMENTS

| | | | |
|---|---|---|---|
| 4,860,115 A | 8/1989 | Ogura | ........................ 358/443 |
| 5,889,597 A | * 3/1999 | Ara et al. | .................... 358/473 |
| 5,924,802 A | * 7/1999 | Sakurai | ........................ 400/61 |
| 6,065,074 A | * 5/2000 | Minamizawa | ................ 710/54 |
| 6,134,030 A | * 10/2000 | Kaneko et al. | ............. 358/505 |
| 6,301,611 B1 | * 10/2001 | Matsumoto et al. | ........ 709/217 |

FOREIGN PATENT DOCUMENTS

| | | |
|---|---|---|
| EP | 0 641 115 A | 3/1995 |
| EP | 0 729 261 A | 8/1996 |
| JP | A8-295053 | 11/1996 |
| JP | A9-39218 | 2/1997 |
| JP | A9-116694 | 5/1997 |

* cited by examiner

*Primary Examiner*—Mark Wallerson
(74) *Attorney, Agent, or Firm*—Morgan & Finnegan, L.L.P.

(57) ABSTRACT

A composite system including a printer having a carriage capable of interchangeably holding a print cartridge and a reader cartridge, and a host computer to which print software and read software are installed, capable of selectively realizing a print function or a read function, and a method for launching the selected function. When a detection mechanism provided in the carriage detects attachment of a cartridge, it outputs a signal indicative of the attachment and type of the cartridge. The host computer automatically launches either the print software or the read software depending upon the signal.

25 Claims, 3 Drawing Sheets

COMPOSITE SYSTEM CAPABLE OF SELECTIVELY REALIZING PRINT FUNCTION AND READ FUNCTION

BACKGROUND OF THE INVENTION

The present invention relates to a composite system capable of selectively realizing print function or read function, e.g., a print apparatus which can function as a scanner, or a read apparatus, by exchanging a print cartridge, installed in a carriage, to a reader cartridge, and a host computer installed with software for printing and software for reading, and a method for executing the read function used in the composite system.

Recently, in a system composed of a plurality of apparatuses to realize a single function, there is a trend to add other function or functions by changing a part of the configuration of an apparatus of the system. As an example of this method, there is a system capable of performing print function and read function using a host computer installed with software for printing and software for reading, and a print apparatus, connected with the host computer so as to be communicable, on which a print cartridge or a reader cartridge can be interchangeably installed.

This system functions as a print system when it is configured with the host computer installed with the software for printing and the print apparatus, connected with the host computer so as to be communicable, on whose carriage a print cartridge is mounted. Further, it functions as a reading system by exchanging the print cartridge on the carriage of the print apparatus to a reader cartridge, and installing the software for reading in the host computer. More specifically, when printing an image, the print cartridge scans the print paper as a result of the movement of the carriage on which the print cartridge is mounted and the paper feed operation; therefore, by mounting a reader cartridge in place of the print cartridge and by feeding an original document to be read instead of the print paper, it is possible for the print apparatus to function as a read apparatus to read the original document. In order to convert the read data of the original document into image data for processing by the host computer, software for reading an image is installed in the host computer. In the foregoing manner, a read function is added to the system.

In this system, by attaching the print cartridge to the carriage of the print apparatus and executing the software for printing in the host computer, the print function is realized, and, in order to switch to a read function from the print function, the print cartridge on the carriage of the print apparatus is changed to a reader cartridge, and the software for reading is executed in the host computer.

When switching from the print function to the read function, first, a user exchanges the print cartridge on the carriage of the print apparatus to the reader cartridge. After exchanging the cartridges, the user has to input an instruction to the host computer to execute software for reading, and the software for reading is executed in response to the operation.

Then, an original to be read is set in the print apparatus, and scanning for reading the original is performed by the reader cartridge. Image data of the original obtained as a result of the scanning is transmitted from the print apparatus to the host computer, and the software for reading, executed by the host computer, converts the transmitted image data of the original into image data capable of being processed. Further, the software for reading performs various processes, for instance, displays the image on a CRT display.

However, when switching from the print function to the read function in the aforesaid system, it is necessary to exchange the print cartridge to the reader cartridge and operate the host computer to execute the software for reading. The foregoing operations to prepare the system to perform the read function are time-consuming and troublesome.

SUMMARY OF THE INVENTION

The present invention has been made in consideration of the above situation, and has as its object to provide a composite system in which operation for preparing for a selected function is simplified when changing functions between a print function and a read function designated by an exchange of a print cartridge and a reader cartridge, an apparatus, such as a printer and a scanner, having a carriage and used in the composite system, an information processing apparatus also used in the composite system, and a function execution method.

According to the present invention, the foregoing object is attained by providing a composite system including a first apparatus having convertible options to function as a printer, a reader, or printer and a reader, and an information processing apparatus to which print software and read software are installed, the system comprising: a detection device for detecting the option, selected or installed, on the first apparatus; and launching means for automatically launching either the print software or the read software installed in the information processing apparatus depending upon the selected or installed option detected by the detection device.

Further, according to the present invention, the foregoing object is also attained by providing an apparatus, having convertible options to function as a printer, a reader, or printer and a reader, which realizes a composite system in combination with an information processing apparatus to which print software and read software are installed, the apparatus comprising: a detection device for detecting the option, selected or installed, on the first apparatus; and output means for outputting a signal indicative of the selected or installed option detected by the detection device.

Furthermore, according to the present invention, the foregoing object is also attained by providing an information processing apparatus to which print software and read software are installed, which realizes a composite system in combination with a first apparatus, having convertible options to function as a printer, a reader, or printer and a reader, the apparatus comprising: launching means for automatically launching either the print software or the read software installed in the information processing apparatus depending upon the option selected or installed on the first apparatus.

Further, according to the present invention, the foregoing object is also attained by providing a function execution method used in a composite system including a first apparatus having convertible options to function as a printer, a reader, or printer and a reader, and an information processing apparatus to which print software and read software are installed, the method comprising: a detection step of detecting the option, selected or installed, on the first apparatus; and a launching step of automatically launching either the print software or the read software installed in the information processing apparatus depending upon the selected or installed option detected at the detection step.

Other features and advantages of the present invention will be apparent from the following description taken in conjunction with the accompanying drawings, in which like

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

Preferred embodiment of the present invention will be described in detail in accordance with the accompanying drawings.

Figure 1:
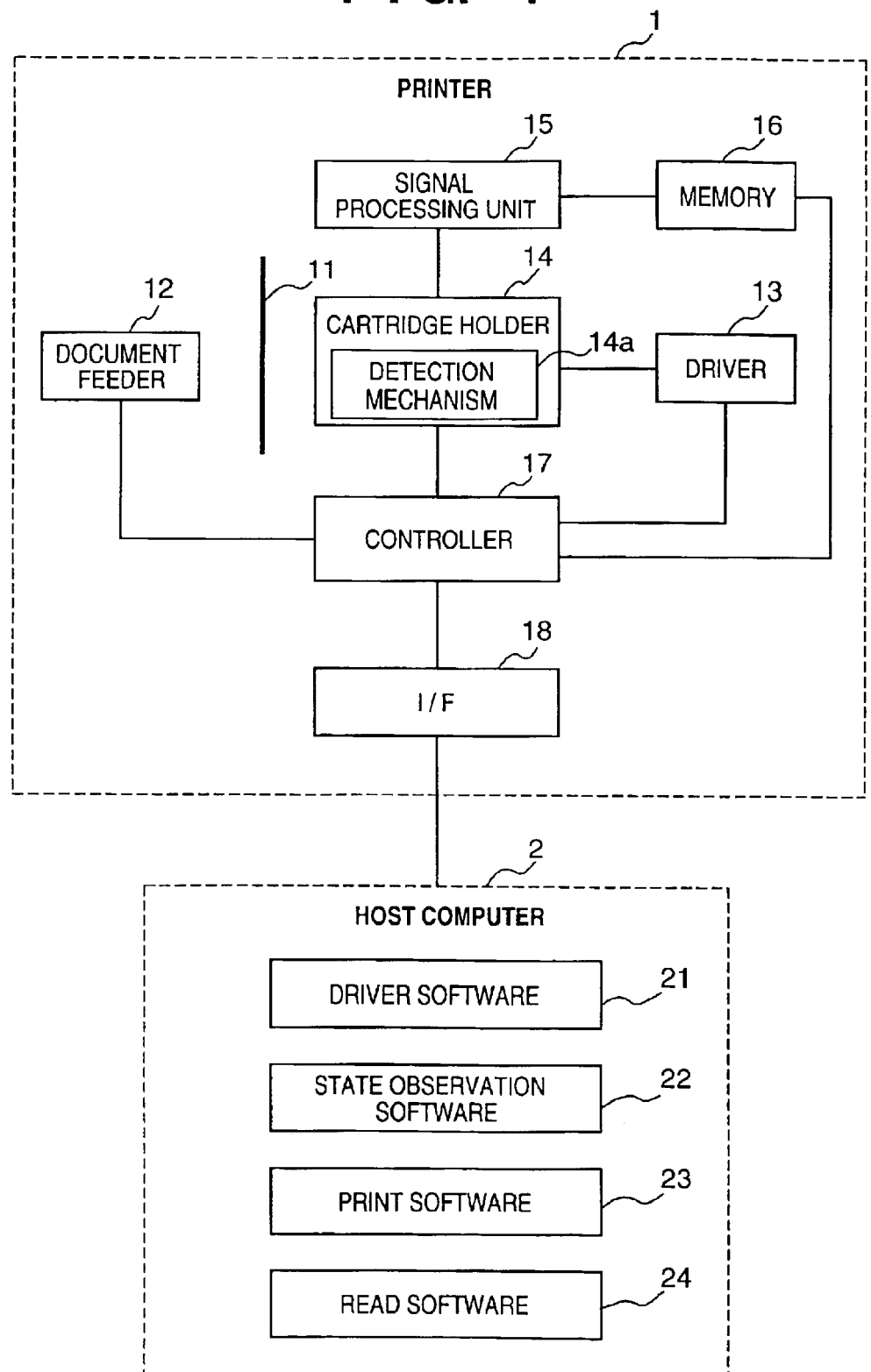
FIG. 1 is a block diagram illustrating a configuration of a composite system according to an embodiment of the present invention.

FIG. 1 is a block diagram illustrating a configuration of a composite system according to an embodiment of the present invention.

The composite system capable of selectively realizing a print function and a read function comprises an ink-jet printer 1 and a host computer 2, as shown in FIG. 1. The printer 1 has a document feeder 12 for feeding print paper (not shown) or an original 11 to be read, a driver 13 for driving a cartridge holder 14 to move reciprocally in the direction perpendicular to the paper feed direction of the print paper (not shown) or the original 11 fed by the document feeder 12.

The cartridge holder 14 is configured so that a print cartridge (not shown) and a reader cartridge (not shown) are exchangeable, and a detection mechanism 14a for identifying whether the print cartridge or the reader cartridge is set is provided in the cartridge holder 14. The print cartridge used in the embodiment is an ink-jet print cartridge. The reader cartridge has a light source, including LEDs of red, green and blue, for instance, and adopts a frame sequential color separation method for reading a color image by sequentially turning on the LEDs. By reciprocally moving the cartridge holder 14 when the print cartridge is installed in the cartridge holder 14, the print cartridge scans the print paper fed by the document feeder 12, and the print cartridge is operated on the basis of print data in synchronization with the scanning operation. Thus, an image is printed on the print paper as a result of the aforesaid operation of the print cartridge. Whereas, by reciprocally moving the cartridge holder 14 when the reader cartridge is installed, the reader cartridge scans the original 11 fed by the document feeder 12, and the reader cartridge is operated so as to sequentially read an image on the original in synchronization with the scanning operation. Accordingly, image data of the read original is inputted to a signal processing unit 15.

The signal processing unit 15 applies predetermined processes to the inputted image data, and the image data applied with the predetermined processes is written in memory 16. The image data written in the memory 16 is read by a controller 17, and the controller 17 transmits the read image data to the host computer 2 via an interface (I/F) 18.

The document feeder 12, the driver 13, the print cartridge, the reader cartridge, and the memory 16 are controlled by the controller 17. In addition to the foregoing control, the controller 17 performs reception control for receiving print data, transmitted from the host computer 2, via the I/F 18. Further, the controller 17 detects the cartridge holding state of the cartridge holder 14 on the basis of the detection result by the detection mechanism 14a provided in the cartridge holder 14, then instructs the host computer 2 to change from the print function to the read function, or vice versa, depending upon the cartridge holding state. Specifically, when a cartridge holding state of the cartridge holder 14 is changed by an exchange of the print cartridge to the reader cartridge, the controller 17 determines that the read function is set, and transmits a signal indicating that the read function is set (referred to as "read function set signal" hereinafter) to the host computer 2 via the I/F 18. Whereas, when a cartridge holding state of the cartridge holder 14 is changed by an exchange of the reader cartridge to the print cartridge, the controller 17 determines that the print function is set, and transmits a signal indicating that the print function is set (referred to as "print function set signal" hereinafter) to the host computer 2 via the I/F 18.

The host computer 2 is connected communicable with the controller 17 via the I/F 18. In the host computer 2, a driver software 21 for managing and controlling the printer 1, software for observing a state of the printer 1 (referred to as "state observation software" hereinafter) 22, software for printing (called "print software" hereinafter) 23, and software for reading (called "read software" hereinafter) 24 are installed. When the state observation software 22 receives a read function set signal, it determines that the function to be executed must be changed from the print function to the read function, and terminates the print software 23 and launches the read software 24. Whereas, when the state observation software 22 receives a print function set signal, it determines that the function to be executed must be changed from the read function to the print function, and terminates the read software 24 and launches the print software 23.

Next, an operational sequence until the read function becomes ready to perform in the composite system and an operational sequence while the read function is being performed are explained with reference to FIGS. 2 and 3.

Figure 2:
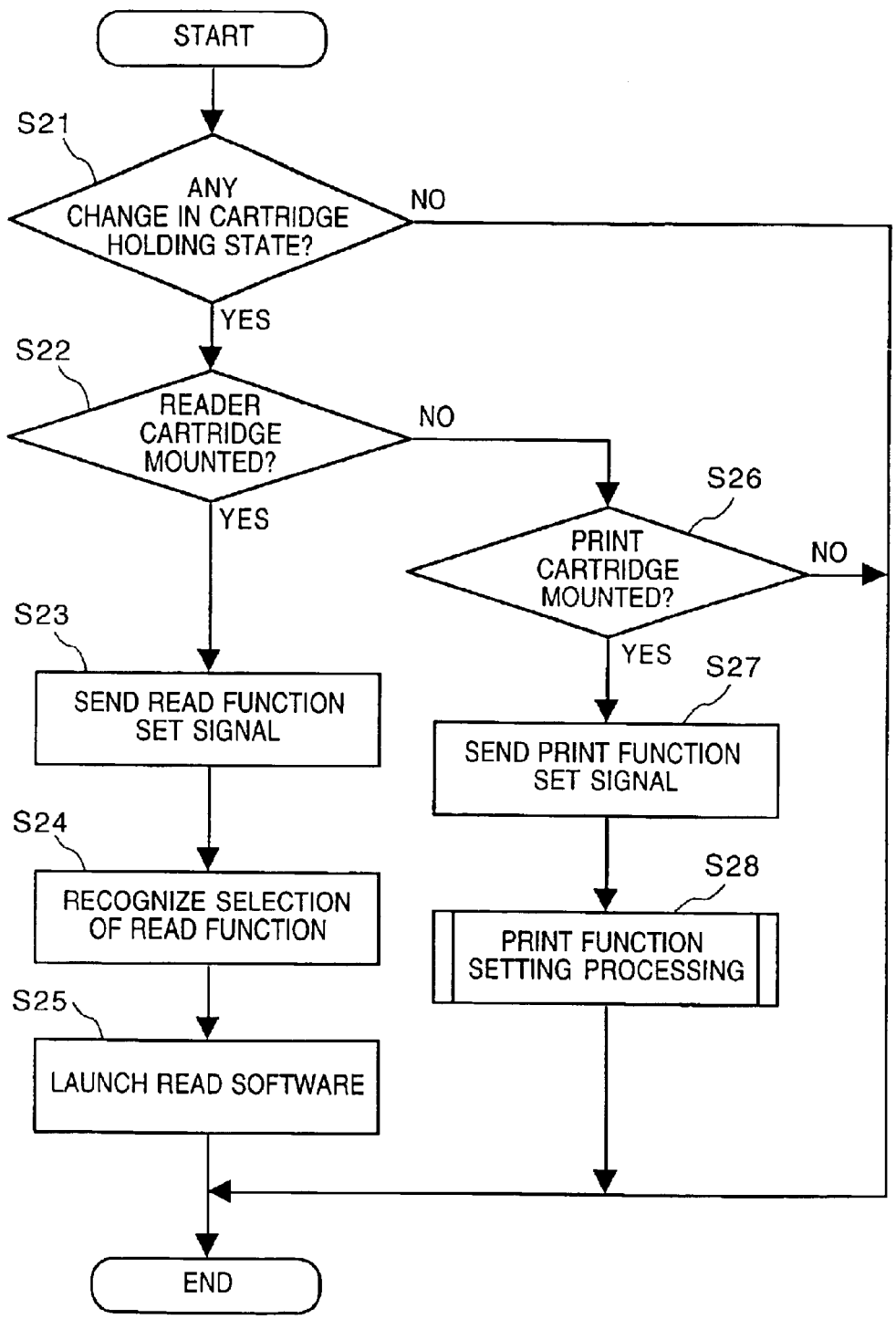
FIG. 2 is a flowchart showing an operational sequence until a read function becomes ready to perform in the composite system shown in FIG. 1.
Figure 3:
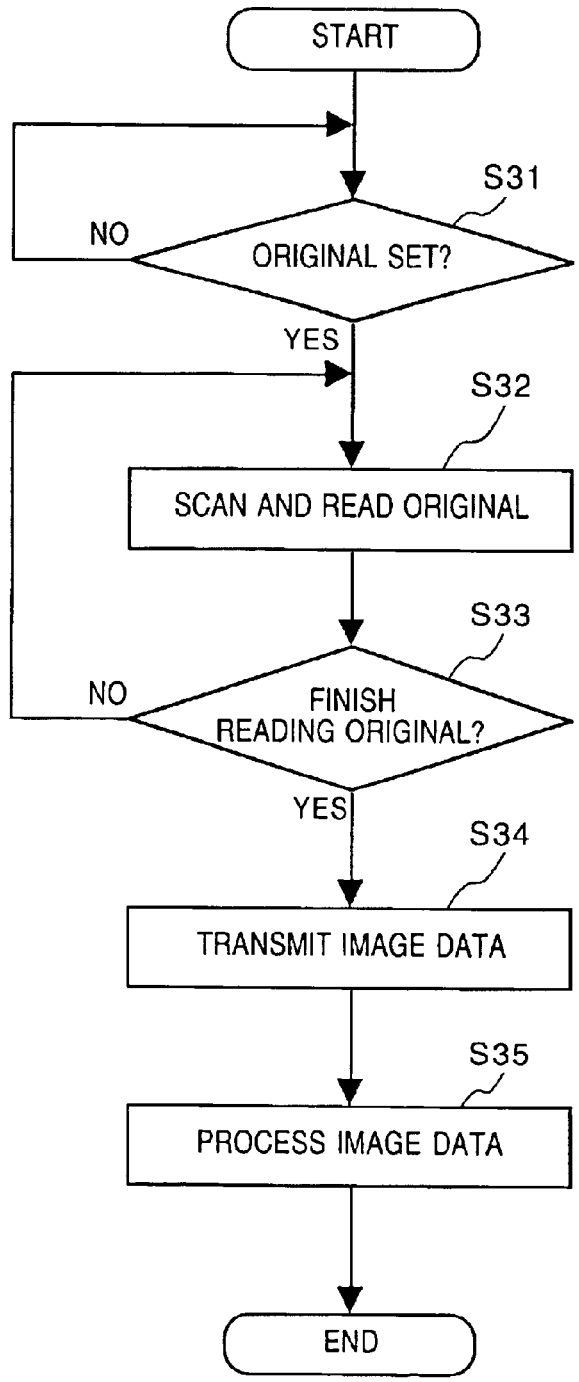
FIG. 3 is a flowchart showing an operational sequence while performing the read function in the composite system shown in FIG. 1.

FIG. 2 is a flowchart showing an operational sequence until the read function becomes ready to perform in the composite system shown in FIG. 1, and FIG. 3 is a flowchart showing an operational sequence while the read function is being performed in the composite system shown in FIG. 1.

Referring to FIG. 2, first in step S21, the controller 17 of the printer 1 observes whether or not there is a change in a cartridge holding state of the cartridge holder 14 on the basis of a detected result of the detection mechanism 14a provided in the cartridge holder 14. If any change in the cartridge holding state is detected, then the process proceeds to step S22, whereas if there is no change, then this process is completed.

In step S22, whether or not the change in the cartridge holding state is caused by mounting a reader cartridge on the cartridge holder 14 is determined on the basis of the detected result by the detection mechanism 14a provided in the cartridge holder 14. If the change in the cartridge holding state is caused by mounting the reader cartridge on the cartridge holder 14, then the process proceeds to step S23, where it is determined that the read function is selected and a read function set signal is sent to the host computer 2 via the I/F 18.

Thereafter, a process in the host computer 2 is started in response to reception of the read function set signal. In step S24, the state observation software 22 recognizes that the read function is selected from the read function set signal, and controls to launch the read software 24 in step S25. Upon launching the read software 24, if the print software 23 has been executed, the state observation software 22 terminates the print software 23 before launching the read software 24. Then, the process is completed, and transits to a state where the reading processing starts as shown in FIG. 3.

Further, when it is determined in step S22 that the change in the cartridge holding state is not caused by mounting a reader cartridge on the cartridge holder 14, then the process proceeds to step S26, where whether the change in the cartridge holding state is caused by mounting a print cartridge or not is determined. If the change is caused by mounting the print cartridge to the cartridge holder 14, then the process proceeds to step S27, where it is determined that the print function is selected, and the print function set signal is transmitted to the host computer 2 via the I/F 18. If the change is not caused by mounting a print cartridge on the cartridge holder 14, then it is determined that exchange of the cartridges of the same type is performed, for instance, and the process is completed.

Next, a process in the host computer 2 is started in response to reception of the print function set signal. In the process of setting the print function, the state observation software 22 recognizes that the print function is selected from the print function set signal, and controls to launch the print software 23 in step S28. Upon launching the print software 23, if the read software 24 has been executed, the state observation software 22 controls to quit the read software 24 before launching the print software 23. Then, the process is completed, and transits to a state where the print processing starts.

After the reader cartridge is mounted and the read software 24 is launched, namely, when the read function is ready for execution, in step S31 in FIG. 3, whether or not an original is set to the document feeder 12 of the printer 1 is checked. After the original is set to the document feeder 12, the process proceeds to step S32 where the scanning of the original starts. In this scanning, as the original to be read is conveyed by the document feeder 12, the cartridge holder 14 on which the reader cartridge is installed is moved reciprocally, thereby the reader cartridge scans and reads the original. Image data obtained by the reader cartridge is inputted to the signal processing unit 15, and after predetermined processes are applied to the image data, the processed image data is written in the memory 16.

Thereafter, the process proceeds to step S33, where whether or not the reading of the original is complete is determined. If not, the process returns to step S32 and the reading of the original is continued; whereas, if the reading of the original is complete, the process proceeds to step S34 where the image data written in the memory 16 is read out, and transmitted to the host computer 2 via the I/F 18.

Accordingly, the host computer 2 receives the image data and processes in the host computer start. In step S35, the read software 24, which has been already launched, processes the received image data, and, for example, displays an image on a CRT display. Then, the processing is completed.

As described above, when the reader cartridge is mounted on the cartridge holder 14, the read software 24 is launched; therefore, it is possible to simplify an operation of setting the read function to be ready for execution when using the printer 1 as a reader.

Further, when an exchange of the reader cartridge to the print cartridge is performed, the read software 24 is automatically terminated and the print software 23 is automatically launched; therefore, it is possible to simplify operations of setting the print function to be ready for execution when the read function has been performed.

In the aforesaid embodiment, a reader cartridge is set to a printer; however, the present invention is not limited to this and applicable to any carriage device capable of holding and using the print cartridge and the reader cartridge. For instance, a printer cartridge may be set to a reading device, and both a printer mechanism and a reader mechanism may be provided to a carriage device and either the printer mechanism or the reader mechanism is used upon selection.

The present invention can be applied to a system constituted by a plurality of devices (e.g., host computer, interface, reader, printer) or to an apparatus comprising a single device.

The present invention is not limited to the above embodiments and various changes and modifications can be made within the spirit and scope of the present invention. Therefore to apprise the public of the scope of the present invention, the following claims are made.

What is claimed is:

1. A composite system including a first apparatus having convertible options to function as a printer and a reader, and an information processing apparatus to which print software and read software are installed, said system comprising:
    a detection device, provide in said first apparatus, adapted to detect the option, selected or installed, on the first apparatus;
    a signaling unit, provided in said first apparatus, adapted to automatically transmit to the information processing apparatus an option selection signal indicative of the detected option when the option is changed; and
    launching means adapted to automatically launch either the print software or the read software installed in the information processing apparatus depending upon the option selection signal received from said signaling unit, and to terminate the print software if the print software is operating and allow displaying an image read by said reader when said detection device detects that said reader is selected or installed.

2. The composite system according to claim 1, wherein, when said option selection signal indicates that the selected or installed option is the reader function, said launching means launches the read software.

3. The composite system according to claim 1, wherein, when said option selection signal indicates that the selected or installed option is the printer function, said launching means launches the print software.

4. The composite system according to claim 1, wherein the option is installed by mounting a print cartridge or a reader cartridge to a carriage of said first apparatus.

5. The composite system according to claim 4, wherein the print cartridge is an ink-jet print cartridge.

6. The composite system according to claim 4, wherein the reader cartridge uses LEDs as a light source.

7. The composite system according to claim 6, wherein color separation method for reading a color image adopted by the reader cartridge is frame sequential method for reading the color image as sequentially turning on each LED.

8. The composite system according to claim 4, wherein the first apparatus is a printer.

9. The composite system according to claim 4, wherein the first apparatus is a scanner.

10. The composite system according to claim 1, wherein said first apparatus has both a printer mechanism and a reader mechanism, and the option is selected between said printer mechanism and said reader mechanism.

11. An apparatus, having convertible options to function as a printer and a reader, which realizes a composite system in combination with an information processing apparatus to which print software and read software are installed, said apparatus comprising:

a detection device for detecting the option, selected or installed; and a signaling unit adapted to automatically output to the information processing apparatus an option selection signal indicative of which of said software should be launched when the detected option is changed and to terminate the print software if the print software is operating and allow displaying of an image read by said reader when said detection device detects that said reader is selected or installed.

12. The apparatus according to claim 11, wherein the option is installed by mounting a print cartridge or a reader cartridge to a carriage of said apparatus.

13. The apparatus according to claim 11, wherein the print cartridge is an ink-jet print cartridge.

14. The apparatus according to claim 12, wherein the reader cartridge uses LEDs as a light source.

15. The apparatus according to claim 13, wherein color separation method for reading a color image adopted by the reader cartridge is frame sequential method for reading the color image as sequentially turning on each LED.

16. The apparatus according to claim 12, wherein the apparatus is a printer.

17. The apparatus according to claim 12, wherein the apparatus is a scanner.

18. The apparatus according to claim 11, wherein said apparatus has both a printer mechanism and a reader mechanism, and the option is selected between said printer mechanism and said reader mechanism.

19. An information processing apparatus to which print software and read software are installed, which realizes a composite system in combination with a first apparatus, having convertible options to function as a printer and a reader, said apparatus comprising:

a receiving unit adapted to receive an option selection signal indicative of the detected option automatically sent from the first apparatus when the option is changed; and launching means adapted to automatically launch either print software or the read software installed in the information processing apparatus depending upon the received option selection signal, and to terminate the print software if the print software is operating and allow displaying an image read by the reader when said reader is selected or installed.

20. The composite system according to claim 19, wherein, when the option selection signal indicates that the reader function is selected or installed, said launching means launches the read software.

21. The composite system according to claim 19, wherein, when the option selection signal indicates that the printer function is selected or installed, said launching means launches the print software.

22. A function execution method used in a composite system including a first apparatus having convertible options to function as a printer and a reader, and an information processing apparatus to which print software and read software are installed, said method characterized by comprising:

a detection step of detecting the option, selected or installed, on the first apparatus;

a signaling step of automatically transmitting from the first apparatus to the information processing apparatus option selection signal indicative of the detected option when the option is changed; and a launching step of automatically launching either the print software or the read software installed in the information processing apparatus depending upon the option selection signal, and terminating the print software if the print software is operating and allowing displaying of an image read by said reader when it is detected in said detection step that said reader is selected or installed.

23. The method according to claim 22, wherein, when the option selection signal indicates that the selected or installed option is the reader function, the read software is launched at said launching step.

24. The method according to claim 22, wherein, when the option selection signal indicates that the selected or installed option is the printer function, the print software is launched at said launching step.

25. A computer program product comprising a computer usable medium having computer readable program code means embodied in said medium for a function execution, method used in a composite system including a first apparatus having convertible options to function as a printer and a reader, and an information processing apparatus to which print software and read software are installed, said product including:

first computer readable program code means for detecting the option, selected or installed, on the first apparatus;

second computer readable program code means for automatically transmitting from the first apparatus to the information processing apparatus an option selection signal indicative of the detected option when the option is changed; and third computer readable program code means for automatically launching either the print software or the read software installed in the information processing apparatus depending upon the option selection signal and terminating the print software if the print software is operating and allowing displaying of an image read by said reader when said reader is selected or installed.

* * * * *